United States Patent [19]

Rumble

[11] Patent Number: 4,489,908
[45] Date of Patent: Dec. 25, 1984

[54] PIPE HANGER

[75] Inventor: Ray M. Rumble, Canfield, Ohio

[73] Assignee: Michigan Hanger Company, Hubbard, Ohio

[21] Appl. No.: 420,019

[22] Filed: Sep. 20, 1982

Related U.S. Application Data

[63] Continuation-in-part of Ser. No. 257,599, Apr. 27, 1981.

[51] Int. Cl.³ .............................................. E21F 17/02
[52] U.S. Cl. ..................................................... 248/62
[58] Field of Search ........................ 248/62, 59, 63, 58, 248/316 A; 411/183, 122

[56] References Cited

U.S. PATENT DOCUMENTS

| | | | |
|---|---|---|---|
| 1,392,810 | 10/1921 | Zifferer | 248/62 |
| 1,822,389 | 9/1931 | Blakely | 248/62 |
| 1,924,353 | 8/1933 | Fitzpatrick | 248/62 |
| 2,158,802 | 5/1939 | Redlon | 248/62 |
| 2,452,186 | 10/1948 | Fluharty | 248/62 |
| 2,762,592 | 9/1956 | Adams | 248/62 |
| 2,996,274 | 8/1961 | Marik et al. | 248/62 |
| 3,236,482 | 2/1966 | Fitzgeral | 248/62 |
| 3,493,206 | 2/1970 | Albro | 248/62 |
| 4,166,600 | 9/1979 | Perjes | 248/62 |
| 4,305,557 | 12/1981 | Kowalski | 248/62 |

FOREIGN PATENT DOCUMENTS

| | | | |
|---|---|---|---|
| 1235665 | 5/1960 | France | 248/59 |
| 0592837 | 11/1977 | Switzerland | 248/62 |
| 2041136 | 9/1980 | United Kingdom | 411/183 |

Primary Examiner—Ramon S. Britts
Assistant Examiner—Ramon O. Ramirez
Attorney, Agent, or Firm—Harpman & Harpman

[57] ABSTRACT

A pipe hanger is arranged to be positioned about a pipe to be suspended, moved to closed position and engaged upon a supporting rod so as to carry the pipe. The hanger takes the form of an elongated band, preferably metal, the ends of which are brought into proximity to one another by bending the band into a general oval shape. The ends of the band are formed in configurations registering with the thread pattern of the support rod when engaged thereagainst and a cylindrical ferrule is moved downwardly over the ends of the band so as to move the same into forceful engagement with the threaded supporting rod. An upstanding tab on one of the ends of the band is then distorted by bending the same downwardly to distort and hold the cylindrical ferrule in desired position in which the ends of the band remain in tight, non-slipping engagement with the threaded support rod.

3 Claims, 4 Drawing Figures

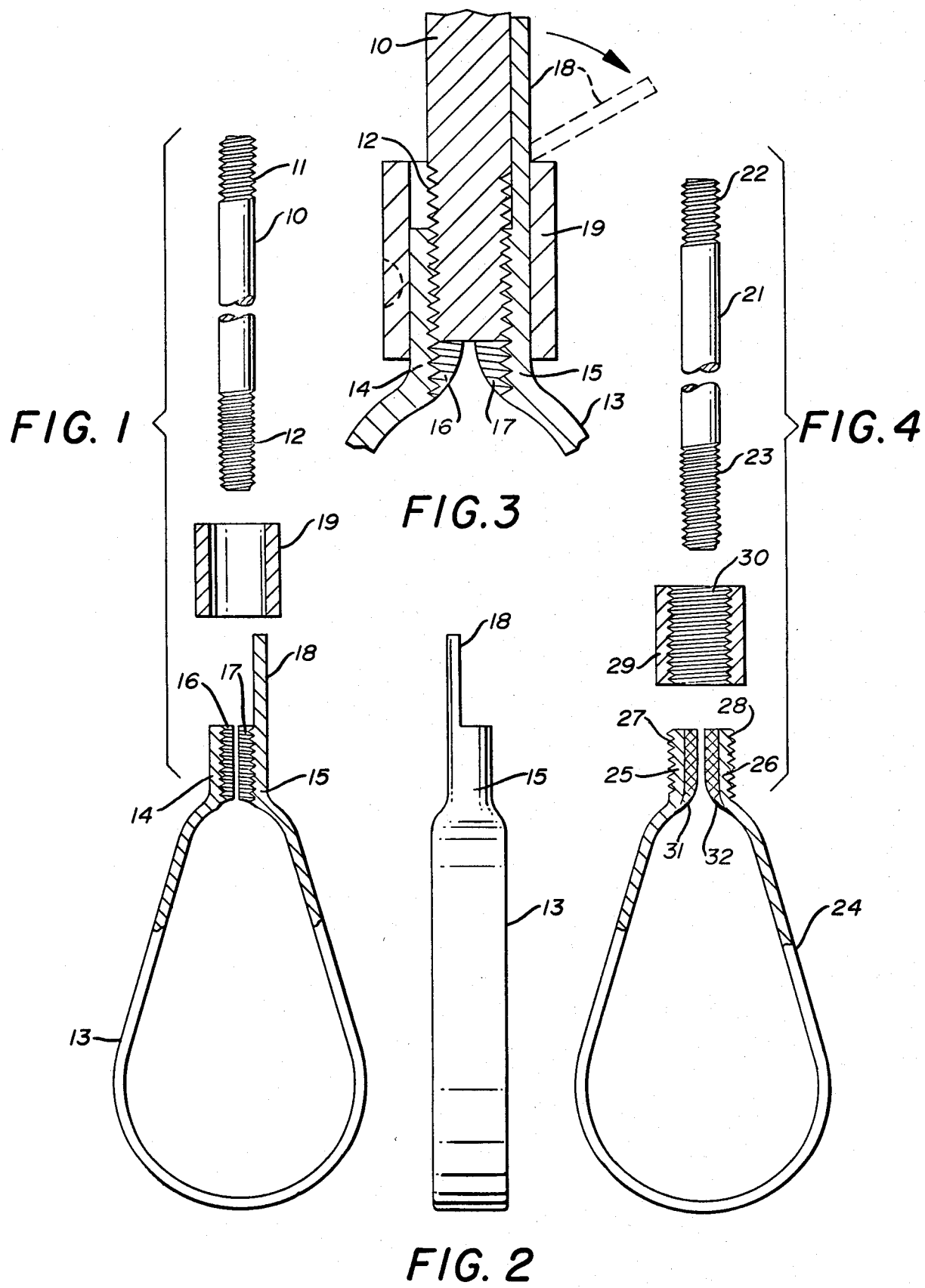

PIPE HANGER

This is a continuation in part of Ser. No. 257,599, filed Apr. 27, 1981.

BACKGROUND OF THE INVENTION

(1) Technical Field

This invention relates to pipe hangers of the type normally employed to suspend pipes from overhead supports in spaced relation thereto.

(2) Description of the Prior Art

Prior structures of this type have generally taken the form of a band arranged in an oval shape with its ends apertured and arranged in superimposed position over a flanged cylindrical coupling which in turn is internally threaded for threaded engagement with a supporting rod and as illustrated in U.S. Pat. No. 2,996,274. Proposals have been made to alter the usual pipe hanger constructions by clampingly engaging the pipe carrying portion of the pipe hanger on a supporting rod or on a fastener carried by a supporting rod and such constructions may be seen in U.S. Pat. Nos. 1,392,810, 2,158,802, 4,166,600 and Swiss Pat. No. 592,837.

The present invention differs from the prior art in providing a simple structure which is less expensive to manufacture and is easier to install than the prior art devices and particularly in the arrangement of the end configurations of the band, which can be stamped in the sheet metal band and the use of a simple cylindrical ferrule, such as a piece of tubing of appropriate inner diameter, which when moved downwardly over the ends of the band engaged on the threaded supporting rod holds the same in firm attached relation thereto and the final locking of the assembly by the bending of the tab on one of the band ends into a position to prevent movement of the cylindrical ferrule.

SUMMARY OF THE INVENTION

An improved pipe hanger is disclosed which is formed of only two pieces which are engagable with a threaded support rod to form a complete pipe hanger. The pieces comprise an elongated band such as formed of sheet metal with end configurations defining half-circular shapes and internally threaded or knurled and arranged to be positioned against the outer opposite sides of a threaded support rod and wedged thereagainst by the application of a cylindrical ferrule thereover, together with a bendable tab on one of the ends of the band which can be moved to a position locking the assembly in desired pipe supporting position.

DESCRIPTION OF THE DRAWINGS

FIG. 1 is an exploded front elevational view with parts broken away and parts in cross section illustrating the pipe hanger and a supporting rod;

FIG. 2 is a side elevation of a portion of the pipe hanger seen in FIG. 1;

FIG. 3 is an enlarged view of an assembly of the portions of the pipe hanger and supporting rod seen in FIG. 1 with broken lines illustrating the locking position of one of the parts; and FIG. 4 is an exploded view of a modified form of a pipe hanger and supporting rod.

DESCRIPTION OF THE PREFERRED EMBODIMENT

By referring to FIG. 1 of the drawings, it will be seen that a supporting rod 10 having threaded end sections 11 and 12 respectively thereon is illustrated and those skilled in the art will observe that such supporting rods are co-mon in the pipe hanger art and are usually affixed at their upper ends to an overhead support, such as a beam of the like, usually by way of a clamp, not shown. A distortable member consisting of an elongated sheet metal band 13 comprises the portion of the hanger which is positioned around a pipe to be suspended thereby, the elongated band 13 has its end portions 14 and 15 respectively shaped in substantially half-circular arcuate configurations with representations of thread patterns 16 and 17 respectively on their inner opposed surfaces when the elongated band 13 is shaped in the oval pipe suspending shape shown in FIG. 1 of the drawings.

The end 15 of the elongated band 13 has an extending tab 18, which is of a length approximately the same as the end configuration 15 of the band 13. In FIG. 2 of the drawings a side elevation of the elongated band 13 will be seen and the substantially half-circular arcuate configuration thereof will be observed to cause it to be narrower in side elevation than the width of the band 13. It will also be seen that the extending tab 18 is formed at one side of the substantially half-circular arcuate configuration in which the end 15 is formed.

In the preferred embodiment of the invention the oppositely disposed, substantially half-circular arcuate configurations of the ends 14 and 15 of the elongated band 13 present an internal diameter substantially the same as the external diameter of the supporting rod 10 and its threaded portion 12 heretofore referred to so that when the substantially half-circular arcuate configurations of the ends 14 and 15 are engaged on the opposite sides of the threaded portions 12 of the rod 10, they will engage in the thread pattern 12 thereof so as to be affixed thereto in a manner capable of holding a pipe to be suspended by the pipe hanger.

By referring again to FIG. 1 of the drawings, it will be seen that a cylindrical ferrule 19 is disclosed and which has an inner diameter slightly larger than the outer diameter of the substantially half-circular arcuate configurations of the ends 14 and 15 of the band 13 so that it can be moved downwardly thereover to hold the ends 14 and 15 in engaged relation against the thread pattern 12 on the supporting rod 10.

By referring now to FIG. 3 of the drawings, the assembly of these parts may be observed and it will be seen that the cylindrical ferrule 19 has been moved downwardly over the ends 14 and 15 of the elongated band 13 so that the representations of the thread patterns 16 and 17 are forcibly engaged in the thread pattern 12 on the support rod 10. The extending tab 18 is shown in solid lines in FIG. 3 in the assembled position and in broken lines showing it after it has been distorted by being bent downwardly so as to hold the cylindrical ferrule 19 in the position illustrated in FIG. 3 of the drawings where the assembly is locked with the elongated band 13 securely attached to the threaded portion 12 of the support rod 10 of the pipe hanger.

Those skilled in the art will observe that it is possible to attach the cylindrical ferrule 19 to the assembly by means other than the distortion of the extending tab 18 as hereinbefore described. For example, a portion of the cylindrical ferrule 19 may be distorted inwardly by the extending tab 18 to lock it against the thread pattern 12 on the support rod 10 of the pipe hanger. Alternately, the cylindrical ferrule 19 may be distorted to bring a portion thereof into locking engagement against the end portions 14 and 15 of the elongated band 13 and move the same into locking engagement to the support rod 10 as desired.

Still further modifications in the pipe hanger disclosed herein are possible and by referring to FIG. 4 of the drawings, it will be seen that a support rod 21 is shown with an upper thread pattern 22 and a lower thread pattern 23 thereon and an elongated band of a pipe hanger is indicated by the numeral 24. The ends of the elongated band 24 of the modification are shaped with desirable configurations including half-circular end portions 25 and 26 respectively and each of these has a thread pattern 27 and 28 respectively on its exterior surface. A modified cylindrical ferrule 29 is shown in FIG. 4 of the drawings with the interior thereof having a continuous thread pattern 30 formed therein. The diameter of the interior surface of the cylindrical ferrule 29 is substantially the same as the exterior diameter of the end portions 25 and 26 of the band 24 so that the thread pattern 30 will register with the representations of the thread patterns 27 and 28 formed thereon which enables the cylindrical ferrule 29 to be rotated and threadably engaged in a manner which will hold the assembly as desired.

A still further modification of the end configurations 25 and 26 of the elongated band 24 as seen in FIG. 4 of the drawings, may be had in that the inner opposed surfaces of the end configurations 25 and 26 may be roughened as by forming knurled surfaces 31 and 32 thereon or otherwise shaped so that a frictional engagement may be had with the thread pattern 23 on the lower end of the support rod 21 heretofore referred to when the device is assembled thereon.

It will thus be seen that an improved and simplified pipe hanger has been disclosed which may be formed in two simple parts; one, the elongated band with its oppositely disposed desirably shaped end configurations registrable with the thread portion of a supporting rod, and the cylindrical ferrule which is moved downwardly thereover to hold the assembly in engagement with the extending tab 18 being used to hold the assembly in locked desired relation.

Although but two embodiments of the present invention have been illustrated and described, it will be apparent to those skilled in the art that various other changes and modifications may be made therein without departing from the spirit of the invention and having thus described my invention what I claim is:

1. An improvement in a pipe hanger, which pipe hanger includes a threaded supported rod, an elongated distortable band to be positioned about a pipe to be suspended, the ends of said distortable band arranged in parallel positions adjacent one another and secured to said threaded support rod, the improvement comprising means securing said ends of said distortable band in engagement with said threaded support rod, means on said ends to cooperate with the threads on said rod said means consisting of end portions of unequal length on said distortable band oppositely disposed area of the opposite sides of said threaded support rod, one of said end portions being longer than the other and extending substantially further along said threaded support rod than said other end portion and a distortable cylindrical ferrule disposed coaxially of said support rod in tightly surrounding relationship with respect to said end portions of said distortable member thereby moving said end portions against said threaded support rod in non-slipping engagement therewith, said ferrule being of a length less than the length of said longer one of said end portions of said distortable band so that part of said longer end portion extends above said ferrule so as to be bendable outwardly and downwardly from said threaded support rod against said ferrule to distort a portion of said ferrule into locking engagement with said support rod.

2. The improvement in a pipe hanger set forth in claim 1 and wherein said distortable ferrule consists of a thin wall tube, the normal inner diameter of which is slightly larger than the outer diameter of said threaded rod with said end portions of said distortable member engaged therein so that the ferrule can be manually moved into position thereover.

3. The improvement in a pipe hanger set forth in claim 1 in which said means on the ends of said distortable band comprise oppositely disposed thread patterns.

* * * * *